United States Patent [19]
Ramiro de la Rosa

[11] 4,059,078
[45] Nov. 22, 1977

[54] STEAM INJECTION APPARATUS

[76] Inventor: Raúl Ramiro de la Rosa, Retorno 805 No. 23, Colonia Centinela, Mexico City 21, Mexico

[21] Appl. No.: 701,933

[22] Filed: July 1, 1976

Related U.S. Application Data

[63] Continuation of Ser. No. 504,614, Sept. 9, 1976, abandoned.

[51] Int. Cl.² .......................................... F02D 19/00
[52] U.S. Cl. ............................ 123/25 K; 123/25 N; 123/25 P
[58] Field of Search ............... 123/25 B, 25 D, 25 K, 123/25 N, 25 M, 25 P, 25 R, 25 A; 261/18 A

[56] References Cited

U.S. PATENT DOCUMENTS

| | | | |
|---|---|---|---|
| 1,494,261 | 5/1924 | Loetscher | 123/25 D |
| 1,674,723 | 6/1928 | Hodges | 123/25 B |
| 1,966,345 | 7/1934 | Harrell | 123/25 N |
| 2,099,802 | 11/1937 | Ewing | 123/25 N |
| 2,444,628 | 7/1948 | Briggs et al. | 123/25 B |
| 2,495,485 | 1/1950 | Schwindler | 123/25 N |
| 2,576,196 | 11/1951 | Stanalis | 123/25 N |
| 2,675,788 | 4/1954 | Porter et al. | 123/25 L |
| 2,681,048 | 6/1954 | Fox | 123/25 N |
| 2,702,027 | 2/1955 | Drydyke | 123/25 N |

*Primary Examiner*—Ronald H. Lazarus
*Assistant Examiner*—Ira S. Lazarus

[57] ABSTRACT

An apparatus for injecting steam into an internal combustion engine including an exhaust manifold and an intake manifold, which has a control valve which receives and controls a flow of water supplied from a source or reservoir of same, and from which the flow of water controlled by the valve is delivered to an evaporator adapted to receive the exhaust gases of the engine and to convert the water passing therethrough into steam, which is thereafter delivered to the intake manifold of the internal combustion engine, increasing the engine power and reducing the contaminants in the exhaust gases therefrom.

1 Claim, 8 Drawing Figures

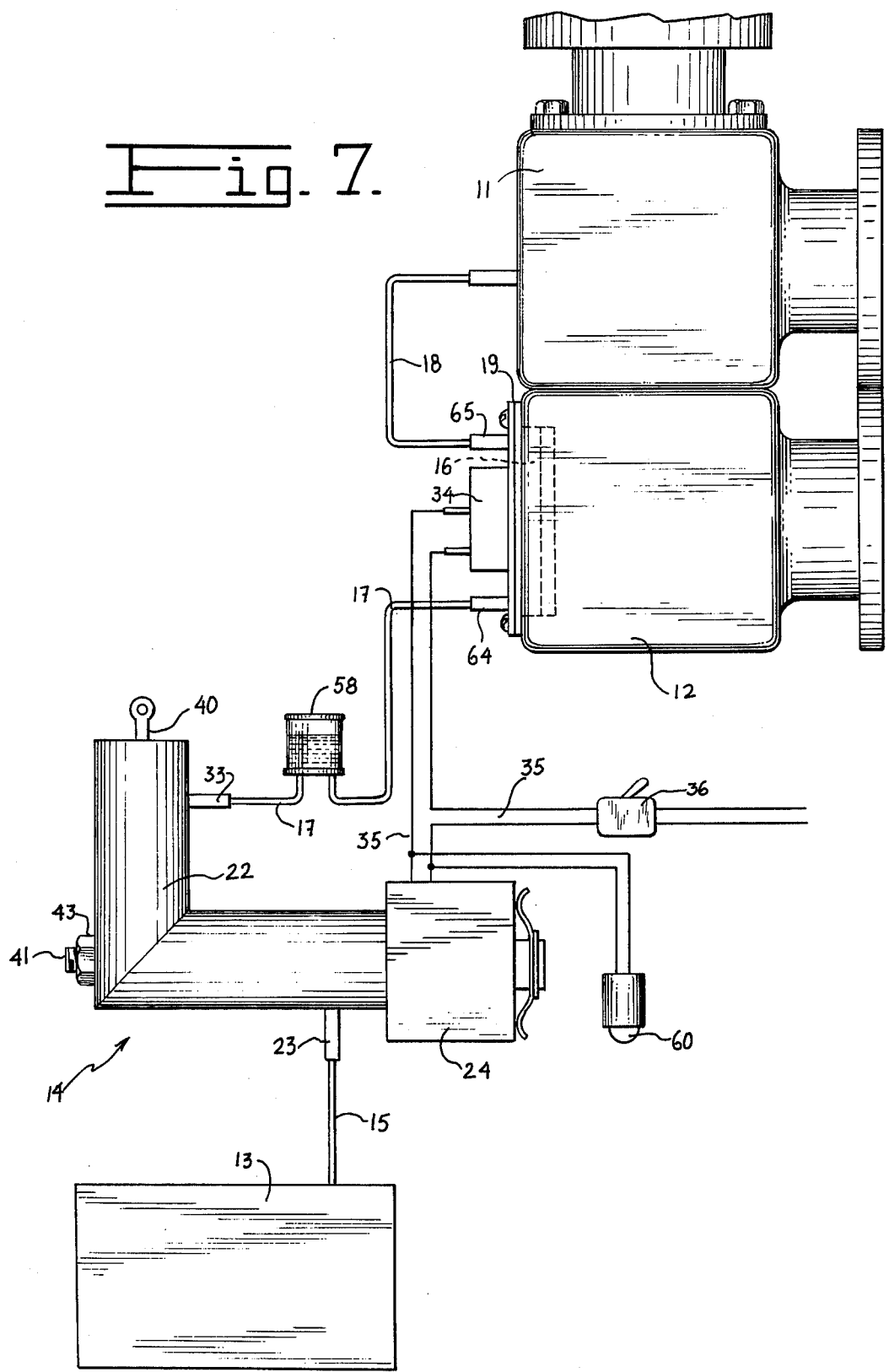

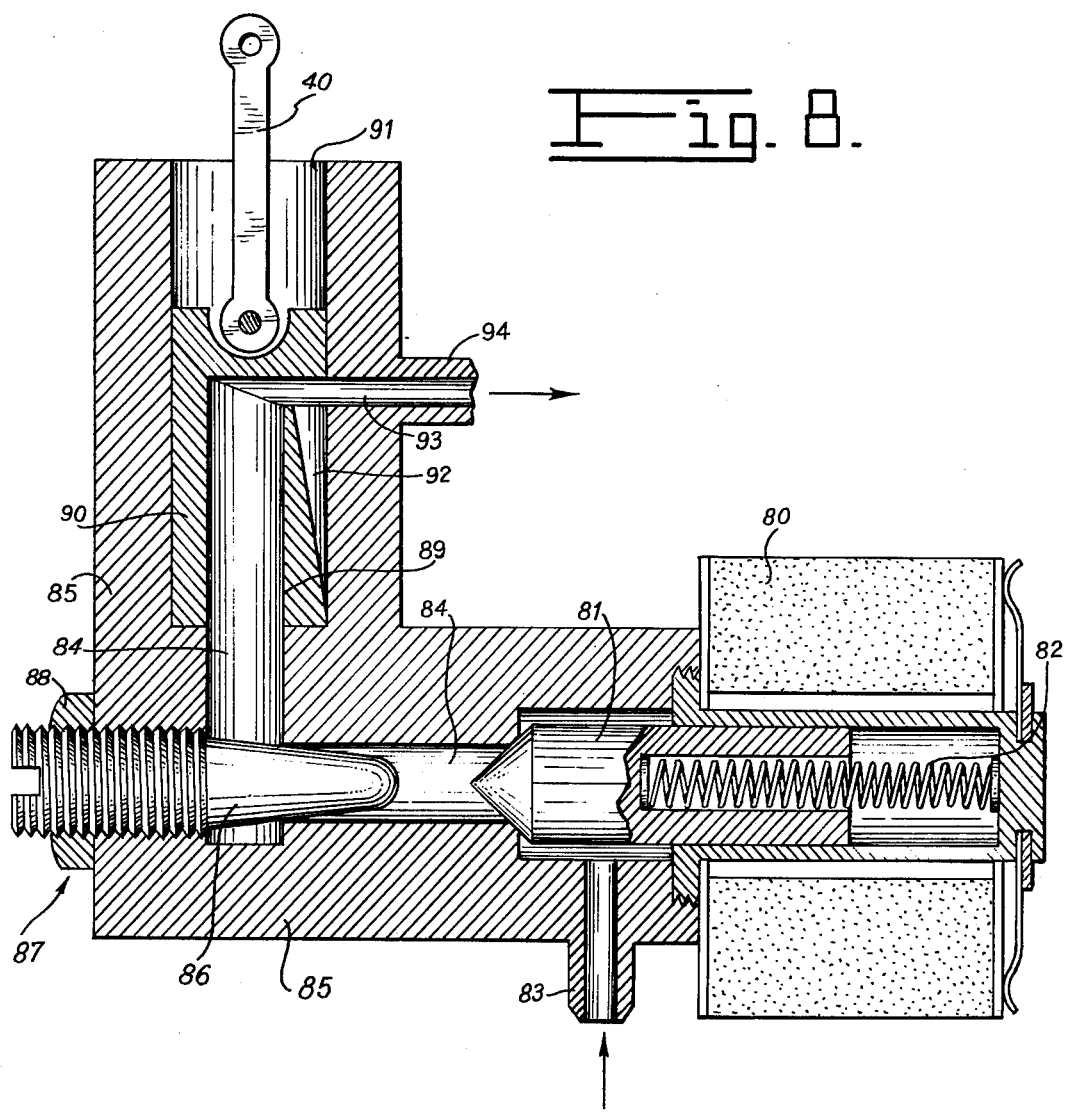

STEAM INJECTION APPARATUS

This is a continuation of application Ser. No. 504,614, now abandoned, filed Sept. 9, 1976.

BACKGROUND OF THE INVENTION

The present energy crisis and the progressive contamination of the environment have intensified the search for solutions for producing an internal combustion engine in which, at the same time that the fuel consumption is reduced without affecting the power of the engine, the contaminants in the exhaust gases can be lessened.

A multiplicity of devices have been proposed for reducing the contaminants in the exhaust gases of the internal combustion engine based on modifying the air-fuel ratio of the mixture; however, notwithstanding favorable results in some cases, they require constant regulation for differing atmospheric pressures.

Other devices of comparable complexity in their regulation have been thought up to change the ignition time in engines, with the object of reducing the combustion temperature and obtaining a reduction of certain contaminants in the exhaust gases.

Engines have also been conceived with dual combustion chambers, of a design highly complex and different from conventional designs, to reduce the contaminants in the exhaust gases of the engines.

Similarly chemical catalysts have been used to convert the contaminants in exhaust gases into harmless components, naturally without affecting the fuel consumption or the power of the engine.

All of the reference types mentioned are outside the scope of this patent and are mentioned only as systems which pursue objectives related to that of the present invention.

A more closely related prior type, although wholly different, is one which relates to systems employing water-gasoline emulsions and the like, as fuel for internal combustion engines; in this case, although the proportion between water and gasoline may be constant, there is danger when the engine is started, and the gasoline is harder to ignite, producing weaker combustion, since part of the caloric energy of combustion will be used to evaporate the water; the cylinders may indeed be flooded with water, with the resulting difficulties.

In no system in existence up to the present time is steam first generated and then injected into an internal combustion engine, that is, by evaporating water outside the engine and thereafter injecting it thereinto, by means of a self-regulated system.

SUMMARY OF THE INVENTION

In view of the foregoing it is an object of this invention to provide an apparatus for injecting steam into an internal combustion engine, increasing its power and reducing the fuel consumption.

Another object of this invention is to provide an apparatus for injecting steam into an internal combustion engine whereby the contaminants in the exhaust gases will be considerably reduced.

A further object of this invention is to provide an apparatus for injecting steam into an internal combustion engine which uses to produce the steam so injected, the waste heat of combustion, providing a cooler exhaust.

A still further object of this invention is to provide an apparatus for injecting steam into an internal combustion engine in which the heat used to generate the steam introduced into the engine is not taken from its normal combustion, so that the heat energy of the fuel is fully used.

One other object of this invention is to supply an apparatus for injecting steam into an internal combustion engine in which there is a thermal control which prevents water from passing directly to the engine even when the latter is being started, and only allows steam to pass when the water has evaporated.

The apparatus for injecting steam into an internal combustion engine which is the object of the present invention, preferably includes a water volume control; accordingly, at any level of engine speed only that quantity of steam is supplied which is adequate to obtain the best operating conditions.

The steam injection apparatus of the present invention is suitable for a motor which has an exhaust manifold and an intake manifold, and comprises a valve which controls a flow of water which it receives from a source or reservoir thereof, and wherein the flow of water controlled by the valve is supplied to an evaporator which receives the exhaust gases of the engine, converting the water which passes therethrough into steam, which is subsequently delivered to the intake manifold of the engine, increasing its power and diminishing the contaminants in the exhaust gases.

These and other objects to be achieved in the use of this invention will be more clearly understood and perceived in the reading of the following description which refers to the accompanying drawings of the preferred embodiments of the invention.

BRIEF DESCRIPTION OF THE DRAWINGS

FIG. 7 is a semi-schematic view of the apparatus for injecting steam into an internal combustion engine similar to the one illustrated in FIG. 1, but including a mechanical linkage to actuate a water flow control valve.

FIG. 8 is a view in conventional lengthwise cross-section showing the internal components of the water flow rate control valve regulating flow to the evaporator illustrated in FIG. 7.

DETAILED DESCRIPTION OF THE INVENTION

Figure 1:
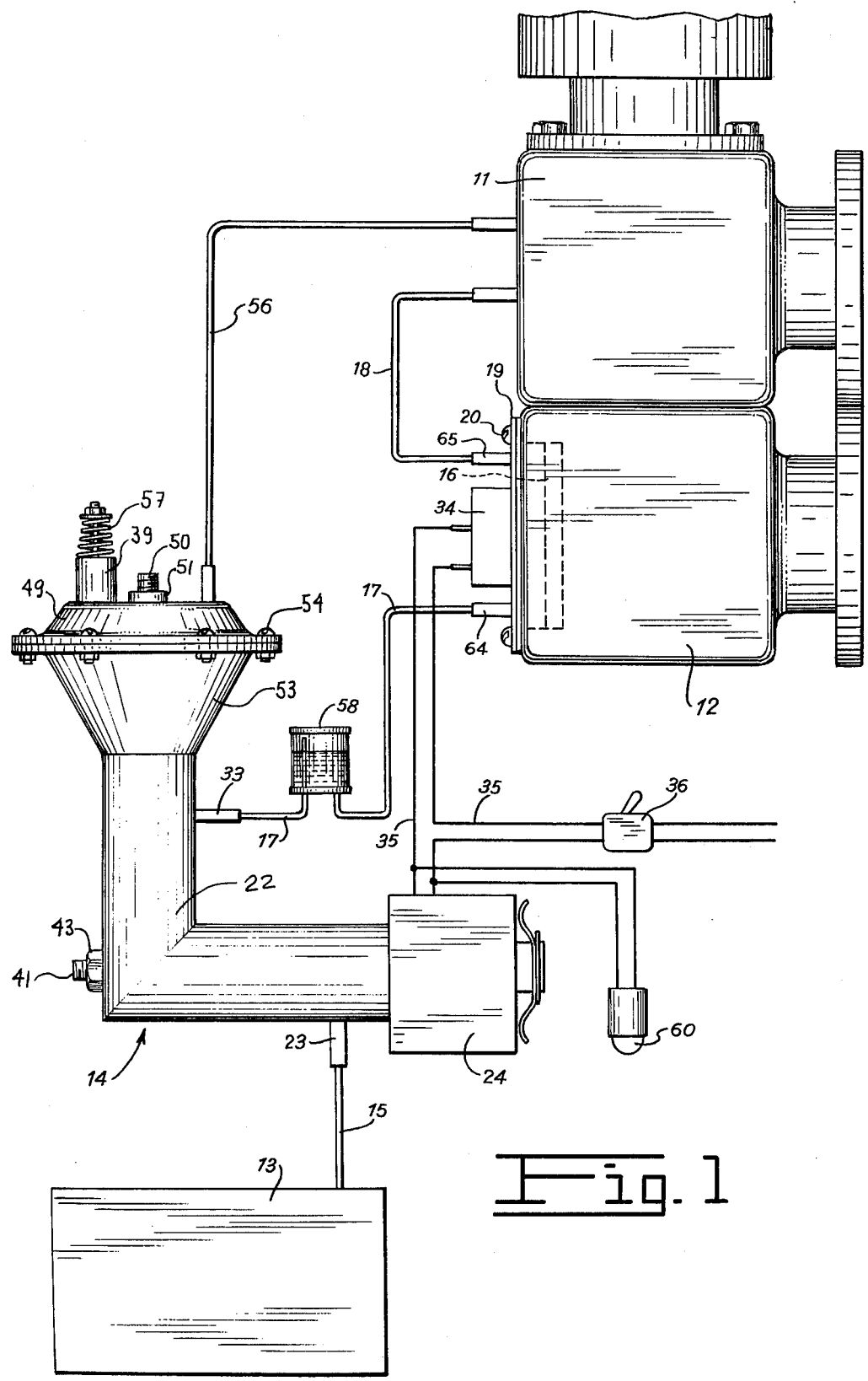
FIG. 1 is a semi-schematic view of the apparatus for injecting steam into an internal combustion engine of the present invention.

This invention refers to an apparatus for injecting steam into an internal combustion engine including an intake manifold 11 and an exhaust manifold 12. The apparatus comprises a source or reservoir of water 13 and a control valve 14 disposed to receive the flow of water through a conduit 15 from source 13, and an evaporator 16, which receives the water through a conduit 17 from the fluid control valve 14. The evaporator 16 is adapted to receive heat from the exhaust gases of the engine coming from the exhaust manifold 12 and to evaporate the water passing therethrough and to transmit the steam generated through passage 18 to the intake manifold 12 of the internal combustion engine for steam injection into the inside of the engine.

In the embodiment of the apparatus of this invention shown in FIG. 1, the flow of water from the reservoir or source 13 through control valve 14, evaporator 16 and passages 17 and 18 is induced by the suction or negative pressure produced in the intake manifold.

In the embodiment of FIG. 1 the evaporator 16 is adapted to be attached to exhaust manifold 12 by means of a flange 19 and fastening means or bolts 20 in order to receive heat from the exhaust gases passing therethrough.

In an alternative arrangement, an evaporator 21 (FIG. 6) of generally tubular construction forms part of the exhaust system of the engine, whereby the exhaust gases which pass through the system pass through the evaporator and transfer heat to it.

Figure 2:
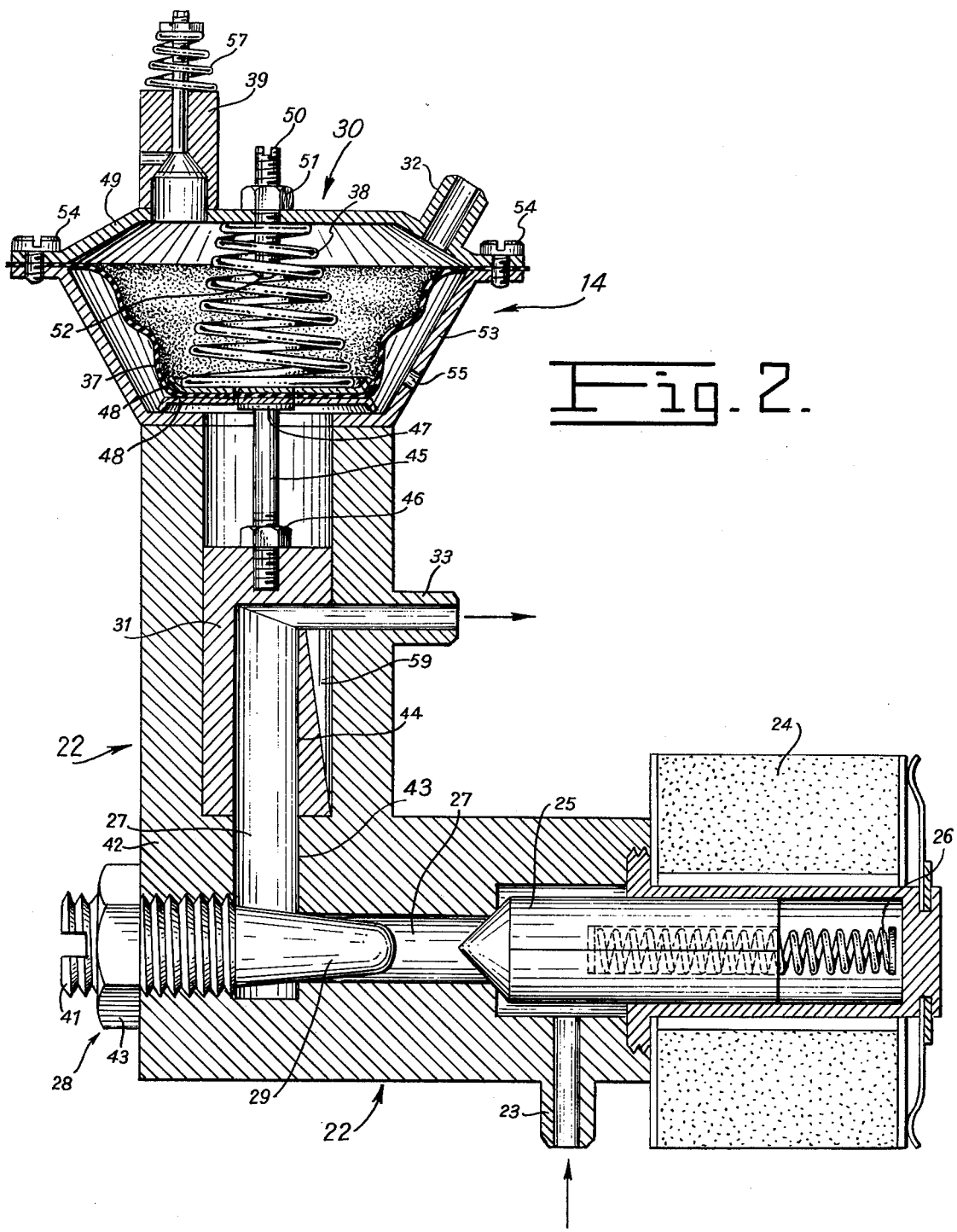
FIG. 2 is a view in longitudinal cross-section illustrating the internal components of the valve for control of water flow to the evaporator, in an embodiment in which it is activated by the vacuum of the intake manifold.

As illustrated in FIG. 2 the control valve 14 comprises a housing or valve body 22, with an inlet passage 23 for water formed in the housing and adapted for connection to the water source 13 by means of conduit 15. A solenoid actuating valve 24 has valve member 25 biassed by means of spring 26, adapted to hold the water entry passage 23 normally closed; said passage opens when the solenoid valve 24 is energized and valve member 25 moves against the pressure of spring 26.

A passage for water flow 27 is formed in housing 22 to receive water from the entry passage 23 when the solenoid valve is energized and valve member 25 is in retracted position.

A water flow rate control valve 28 includes a conical valve member 29 placed in the water passage 27 which is adjustable to vary the flow rate of the water. It also includes vacuum sensing devices 30 connected to a valve member 31 and adapted to be connected through passage 32 to the intake manifold through conduit 56, and can be actuated to move valve member 31 to control the water flow in relation to the degree of suction in the intake manifold, the relation being such that greater suction permits the passage of less fluid water to the evaporator by means of water outlet 33 in housing 22, which receives water from water passage 27 and is adapted to be connected to evaporator 16 by means of conduit 17 in order to supply water thereto.

In FIG. 1, switch 34 is shown as a part of the apparatus of the present invention; it is sensitive to temperature, and is mounted on evaporator 16 to energize solenoid 24 by connecting it to a source of electric current by means of conductors 35 and a manual switch 36.

Vacuum-sensitive device 30 comprises a diaphragm 37 under pressure from spring 38; diaphragm 37 is inside of case 53 fixed to the upper periphery of housing 22 and disposed for connection to intake manifold by means of passage 32 and with the atmosphere through another passage 39 or relief valve.

In the embodiment shown in FIGS. 7 and 8 said vacuum-sensing device 30 for actuating valve member 31 is replaced by mehanical linkage 40, which is connected directly to the accelerator control.

Returning to FIG. 1, when the internal combustion engine is started, electrical energy is delivered by conductors 35 to solenoid 24 through temperature-sensitive switch 34, which closes when a predetermined temperature is reached, thus energizing solenoid 24 pulling valve member or piston 25 against the pressure of spring 26, opening water passage 27, whereby water circulates from source 13 through passage 15 and 23 and passage 27, depending on the adjustment of valve 28, which is composed practically of a needle valve with conical portion 29 and threaded portion 41, connected directly to a wall 42 of the valve body or housing 22; threaded portion 41 includes for attachment a fastening element or nut 43. Accordingly, depending on the position or adjustment of the conical portion or valve member 29, a given quantity of water as a maximum is supplied through passage 27, which consists both of a bore 43 in valve body 22 and of a colinear perforation 44 in slideable valve member 31 which is in effect a cylindrical portion or piston joined to rod 45 and having a means of attachment or nut 46, rod 45 being firmly secured at its upper end 47 to diaphragm 37 sandwiched by a pair of back plates 48, upon one of which helical spring 38 acts directly, said spring bears the other end against the inside face of a cover 49 which includes a bolt 50 which can be adjusted with nut 51 to vary the stroke of piston 31 when plate 48 contacts the lower end 52 of the adjusting bolt 50. Cover 49 is secured to case 53 by bolt means 54, the edges of diaphragm 37 being sandwiched between cover 49 and case 53 and said diaphragm 37 being actuated by suction from the intake manifold transmitted through passage 32 joined to cover 42, case 53 being fixed to the upper edge of housing 22.

Case 53 further includes an orifice 55 which acts as vacuum braker to permit free operation of diaphragm 37 in cover 49; in addition to passage 32 which communicates with intake manifold 11 via conduit 56, there is also a passage 39 which communicates with the atmosphere and is composed of a check valve regulated with a spring 57 and which acts as a relief valve compensating substantial negative pressures.

The quantity of water transmitted to evaporator 16 by the orifice 44 of cylinder or piston 31 and through passage 33, conduit 17 and sight gauge 58 varies in volume due to a volume-regulating cut 59 which increases or diminishes the volume of water supplied to the evaporator depending on the position of the said piston 31 in its stroke, as shown in FIG. 2; under greater suction cylinder 31 will move in such a manner as to reduce the amount of water supplied to the evaporator and hence reducing the quantity of steam injected into the intake manifold 11 of the engine. The electric circuit includes also a lamp 60 connected in such a fashion that it will go on to indicate the system is in operation, which fact can also be corroborated in sight gauge 58. When it is desired to interrupt the operation of the steam injection system manually, this can be done by moving manual switch 36.

Figure 3:
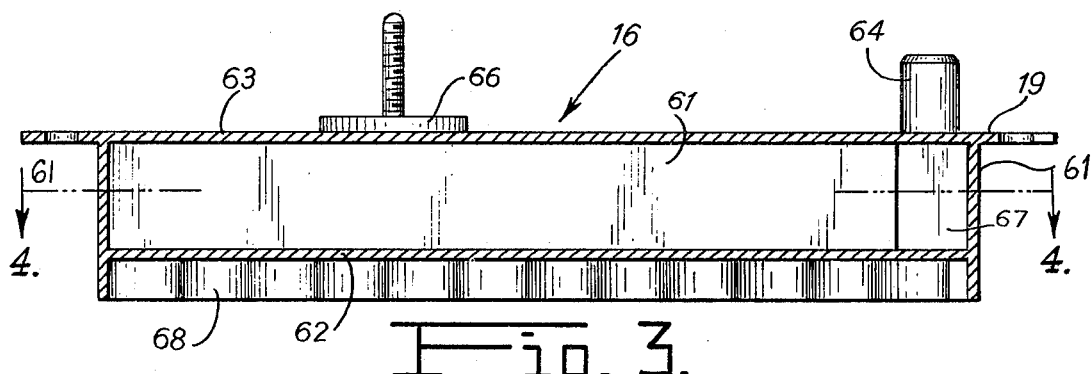
FIG. 3 is a view in conventional longitudinal cross-section illustrating an embodiment of the evaporator shown in FIG. 1 in which water supplied from the valve in FIG. 2 is evaporated, and steam is supplied therefrom to the intake manifold.
Figure 4:
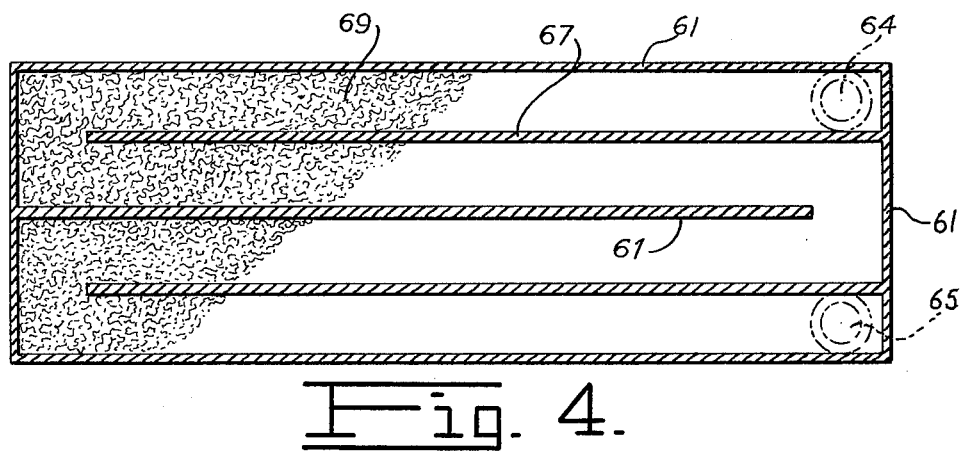
FIG. 4 is a view in transverse cross-section along 4—4 of the evaporator shown in FIG. 3.
Figure 5:
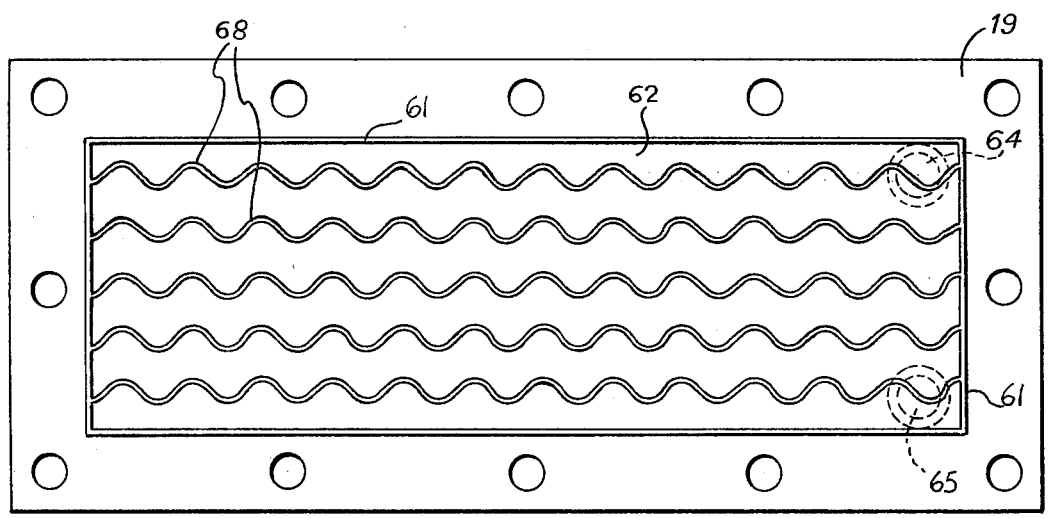
FIG. 5 is a lower plan view of the embodiment of the invention shown in FIGS. 3 and 4, illustrating the fins for absorbing heat from the exhaust gases.

Evaporator 16 illustrated in FIGS. 3, 4 and 5, is composed of a case with lateral walls 61, bottom wall 62 and cover 63, which cover includes a projection or flange 19 which permits its attachment to exhaust manifold 12.

Cover 63 also includes passage 64 and 65 which are respectively for water entry and for steam discharge, and a support structure 66 of switch 34 which is sensitive to temperature.

The evaporator case includes in its interior a plurality of alternating walls 67 forming a labyrinth for the passage of water therethrough, in order to increase the heat interchange and increase the quantity of heat for evaporation thus raising the efficiency of the evaporator. In the embodiment illustrated in FIGS. 3 to 5 there is shown on the bottom wall 62 a plurality of exterior fins 68 for increasing the heating area, since the exhaust gases are in contact with these fins. In the channels of the labyrinth formed by the inside walls of the evaporator metal wool or the like is included to increase the heat exchange.

Figure 6:
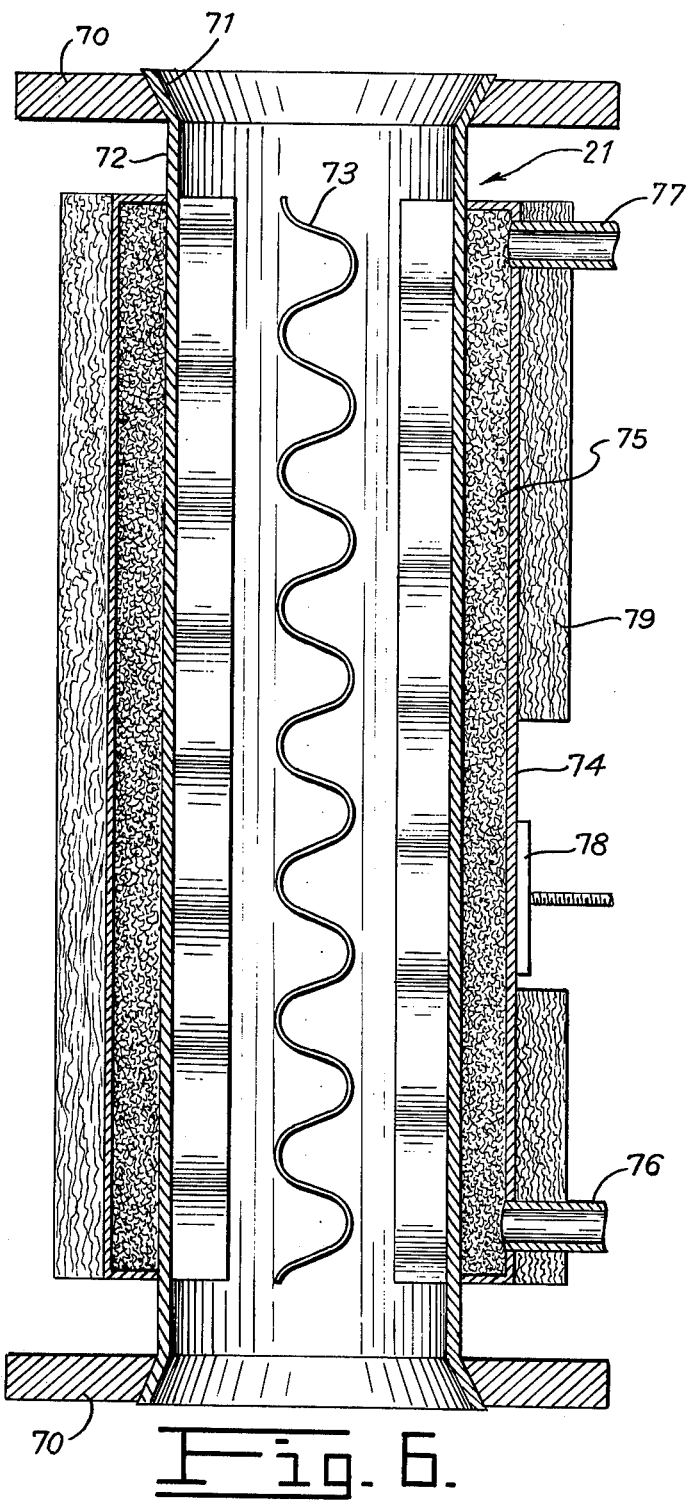
FIG. 6 is a view in conventional longitudinal cross-section showing another embodiment of the evaporator in which it is disposed directly against the tube of the exhaust gases.

In FIG. 6 is shown an embodiment of the evaporator which is of a tubular type to be attached directly between the wall of exhaust manifold 12 and the exhaust pipe itself by means of end flanges 70, which are attached to the evaporator which includes an enlarged end portion 71 of tube 72 which largely forms the evaporator. On the inside of tube 72 there are included undulating fins 73 which increase the surface of thermal exchange and on the outside of the tube there is included sleeve 74 which surrounds said tube, and on the inside of said sleeve 74 metallic wool 74 is also placed to increase the heat exchange; said sleeve 74 includes two passages 76 and 77 which are respectively for entry of water and for discharge of steam, and also carries support 78 of the temperature-sensing switch. This sleeve should be thermally insulated with a layer 79 of thermal insulation.

In FIG. 8 is illustrated an embodiment of the water flow control valve which because of the simplicity of the operating mechanism may prove more economical than actuation by means of vacuum. In this embodiment when solenoid 80 is energized piston 81 is moved in opposition to the action of a spring 82, permitting the passage of water through a passage 83 and a passage 84, formed in the valve body 85, and depending upon the adjustment of the conical portion 86 of a needle valve 87 which is threadedly secured to the valve body 85 by means of locknut 88, a predetermined maximum quantity of water is allowed to pass through passage 84 coinciding with orifice 89 in sliding piston 90, which slides by means of the action of a rod 40 within a wall 91, depending on the mechanical movement of the accelerator which is not illustrated in these drawings. When piston 90 moves through the action of rod 40 a variable volume of water is supplied due to a regulating orifice 92 formed in the wall of cylinder 90 which is integral with the escape orifice 93, which coincides with passage 94 which communicates with the evaporator 16 by means of conduit 17.

As can be observed, the operation of this invention embodiment is the same as that of the embodiment of the valve illustrated in FIG. 2 with the difference that the movement of piston 31 and 90 for regulating the quantity of water supplied to the evaporator is governed in the once case by suction from the intake manifold and in the other case by linkage coupled to the engine accelerator.

Notwithstanding that the foregoing description is drawn to the preferred embodiments of the invention, it will be understood by all skilled persons in the field that any change in form and detail, such as the regulation of the volume of water and the like, will be within the scope and spirit of this invention.

I claim:
1. In an internal combustion engine having an accelerator control, an exhaust manifold and an intake manifold, a steam injection apparatus comprising:
   a source of water,
   a temperature-sensitive switch arranged to operate at a predetermined engine temperative;
   a control valve responsive to operation of said temperative-sensitive switch and adapted for connection to a said accelerator control to control the rate of flow of water from said source,
   an evaporator arranged to receive water from said control valve and to receive heat from exhaust gases of said engine thereby to evaporate water passing therethrough to produce steam, and
   means adapted to transmit steam so produced into a said intake manifold;
   said control valve comprising:
   a housing,
   a water inlet conduit formed in said housing and adapted for connection to said source,
   a solenoid actuated valve having a valve member spring biased to close said inlet conduit and a solenoid connected to be energized upon operation of said temperative-sensitive switch to move said valve member against said spring bias thereby to open said inlet conduit to permit flow of water therethrough,
   a water passage conduit formed in said housing to receive water from said inlet conduit when said solenoid actuated valve is energized,
   a needle valve means to preset maximum flow rate through said water passage conduit and comprising a needle valve member having a conical portion disposed in said water passage conduit,
   said needle valve member being adjustable by screw means to cause said conical portion to restrict said conduit to an extent which is in accordance with a desired maximum water flow rate,
   a water flow rate control valve having a cylindrical valve member disposed for reciprocal movement in a bore in said housing to receive and control water flowing in said water passage conduit through said needle valve means; said cylindrical valve member having a flow regulating slot, of varying cross-section, in and axially extending along its periphery, linkage means adapted for connection to said accelerator control to reciprocally move said valve member in said bore in dependence upon movement of said accelerator control, wherein said slot cooperates with an outlet from said housing to vary the flow rate of water from said control valve to said evaporator in dependence on the position of said valve member in said bore so that the greater the opening of the accelerator control the greater the flow rate; and
   said housing outlet being adapted for connection to a conduit to said evaporator to supply water thereto.

* * * * *